United States Patent
Wu et al.

(10) Patent No.: US 10,475,450 B1
(45) Date of Patent: Nov. 12, 2019

(54) MULTI-MODALITY PRESENTATION AND EXECUTION ENGINE

(71) Applicant: Amazon Technologies, Inc., Seattle, WA (US)

(72) Inventors: Felix Wu, Seattle, WA (US); Rohan Mutagi, Redmond, WA (US); Manuel Jesus Leon Rivas, Seattle, WA (US); Noel Evans, Seattle, WA (US); Frédéric Johan Georges Deramat, Seattle, WA (US); Miguel Alberdi Lorenzo, Seattle, WA (US); Lev Danielyan, Mill Creek, WA (US); Vikram Kumar Gundeti, Bellevue, WA (US); Vijitha Raji, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 59 days.

(21) Appl. No.: 15/696,829

(22) Filed: Sep. 6, 2017

(51) Int. Cl.
    *G10L 15/22* (2006.01)
    *G10L 15/18* (2013.01)
    *G10L 15/30* (2013.01)
    *G10L 15/26* (2006.01)

(52) U.S. Cl.
    CPC .......... *G10L 15/22* (2013.01); *G10L 15/1815* (2013.01); *G10L 15/30* (2013.01); *G10L 15/26* (2013.01); *G10L 2015/223* (2013.01)

(58) Field of Classification Search
    CPC ....................................................... G10L 15/26
    See application file for complete search history.

(56) References Cited

U.S. PATENT DOCUMENTS

| | | | | |
|---|---|---|---|---|
| 2006/0002681 | A1* | 1/2006 | Spilo | H04N 5/76 386/220 |
| 2008/0235018 | A1* | 9/2008 | Eggen | G10L 15/26 704/251 |
| 2010/0057470 | A1* | 3/2010 | Silvera | G11B 27/105 704/275 |

* cited by examiner

*Primary Examiner* — Feng-Tzer Tzeng
(74) *Attorney, Agent, or Firm* — Pierce Atwood LLP

(57) ABSTRACT

Techniques for synchronously outputting content by one or more devices are described. A system may receive a user command and may receive content responsive to the command from an application(s). The content may include various kinds of data (e.g., audio data, image data, video data, etc.). The system may also receive a presentation framework from the application, with the presentation framework indicating how content responsive to the input command should be synchronously output by one or more devices. The system determines one or more devices proximate to the user, determines which of the one or more devices may be used to output content indicated in the presentation framework, and causes the one or more devices to output content in a synchronous manner.

23 Claims, 15 Drawing Sheets

FIG. 4

```
"presentation": {
  "sequence": [          404
    {
      "begin": {
        "offsetInMillis": 0
      },
      "instructions": [
        { "id": "D1", "device": "device001", "type": "speak", "ssml": "<speak>What do you call a dog magician?</speak>" },
        { "id": "D2", "device": "device001", "type": "displayImage", "imageUrl": "s3://alexaJokes/puzzledDog.jpg" }
        { "id": "D3", "device": "device002", "type": "displayCard", "cardText": "What do you call a dog magician?" },
      ]
    },
    {
      "begin": {
        "onEvent": { "directiveId": "D1", "event": "SpeechFinished" },
        "offsetInMillis": "3000"
      },
      "instructions": [
        { "id": "D4", "device": "device001", "type": "speak", "ssml": "<speak>A Labracadabrador!</speak>"},
        { "id": "D5", "device": "device001", "type": "displayImage", "imageUrl": "s3://alexaJokes/spellCastingDog.jpg"}
        { "id": "D6", "device": "device002", "type": "displayCard", "cardText": "A Labracadabrador!"},
      ]
    },
  ]
}
```

402 — (first instructions block)
406 — (second instructions block)
408 — "begin":

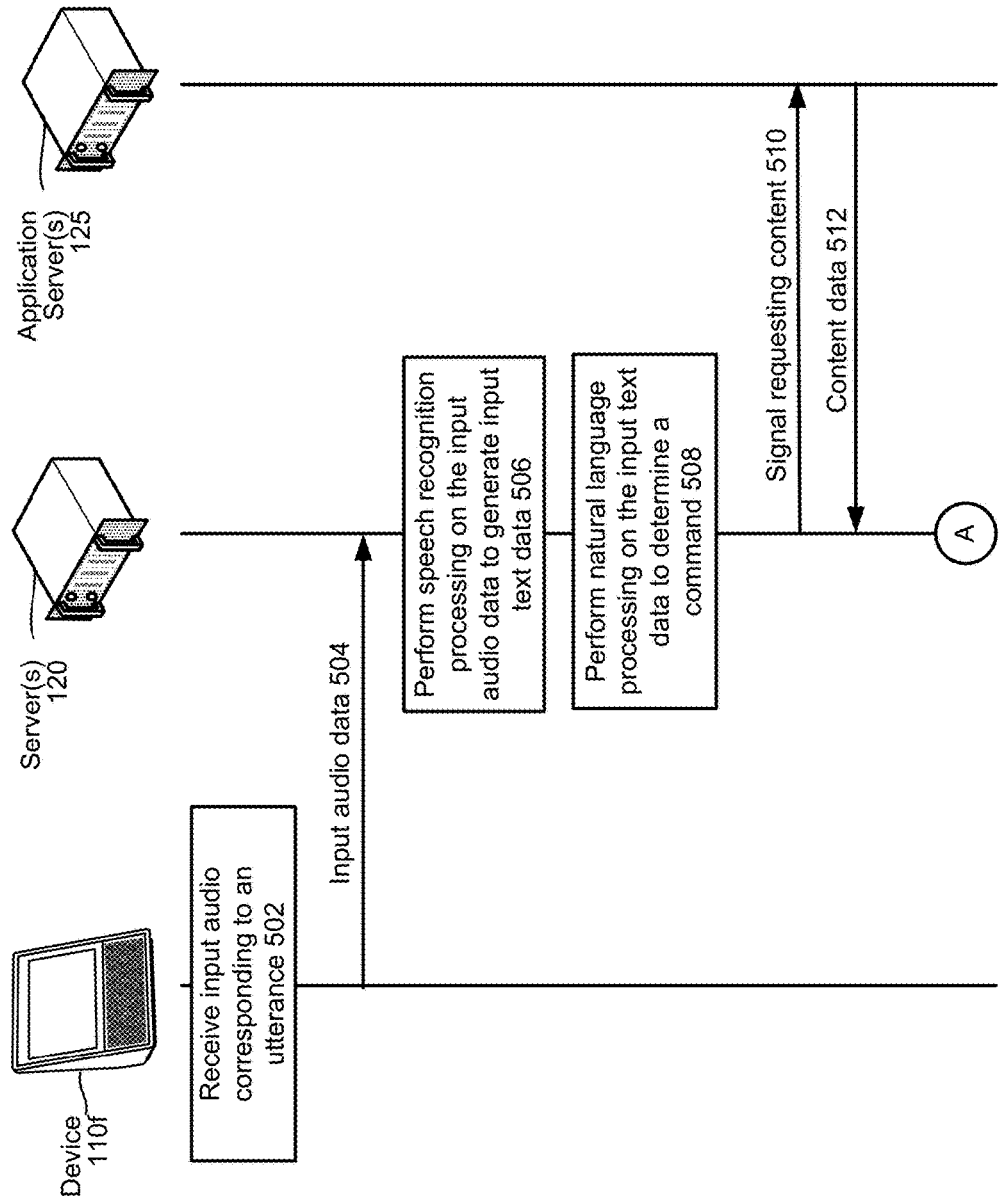

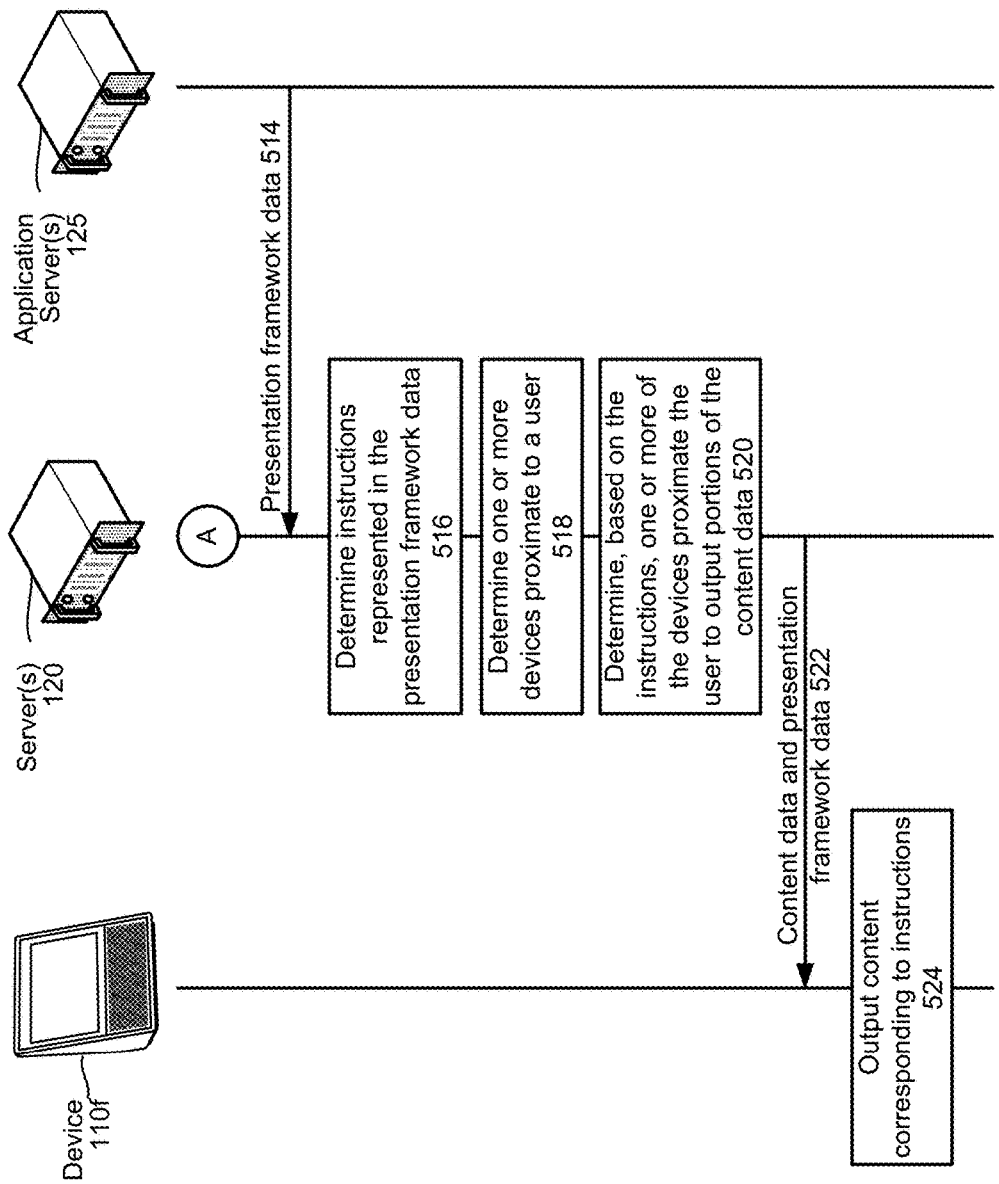

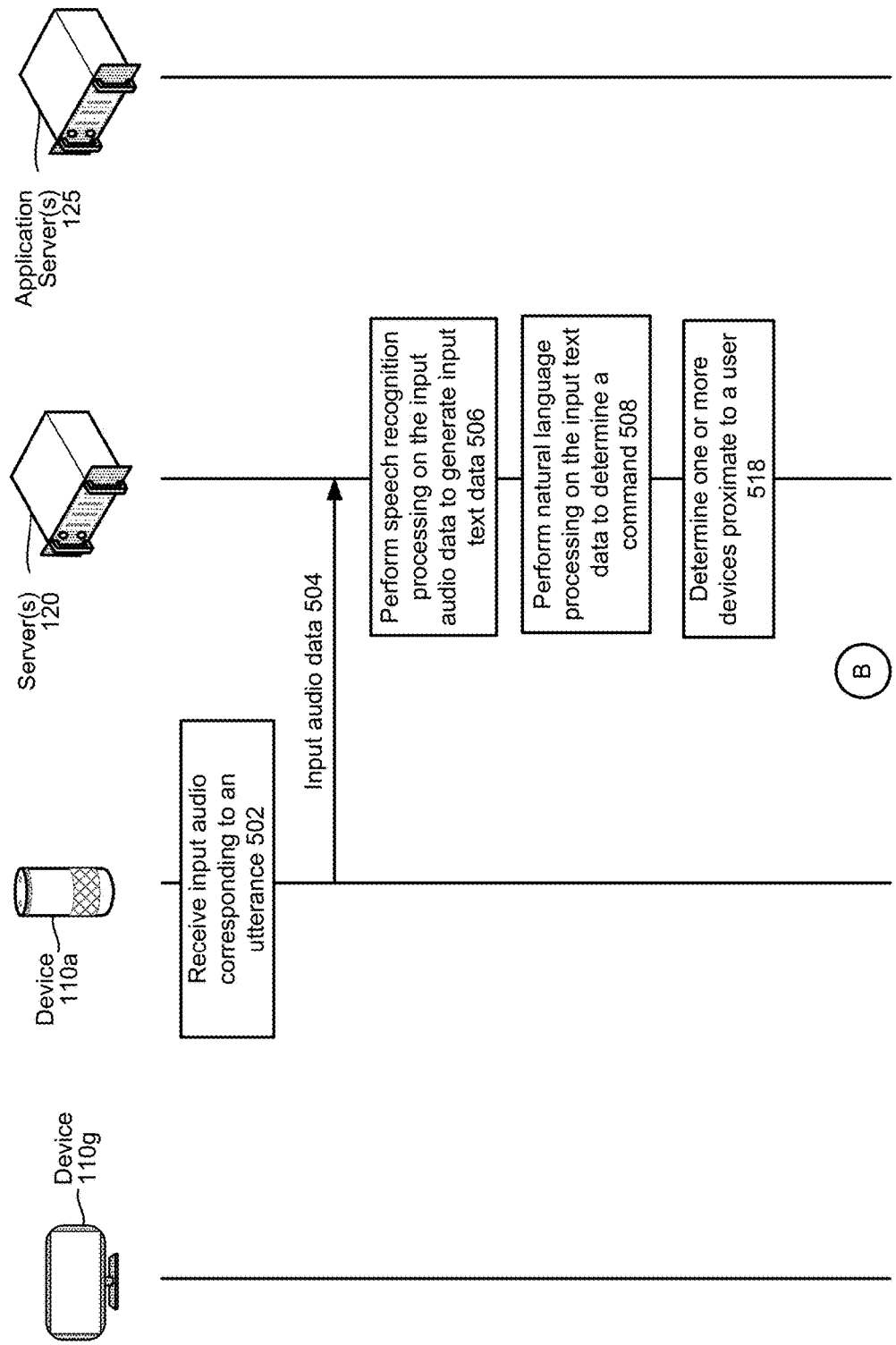

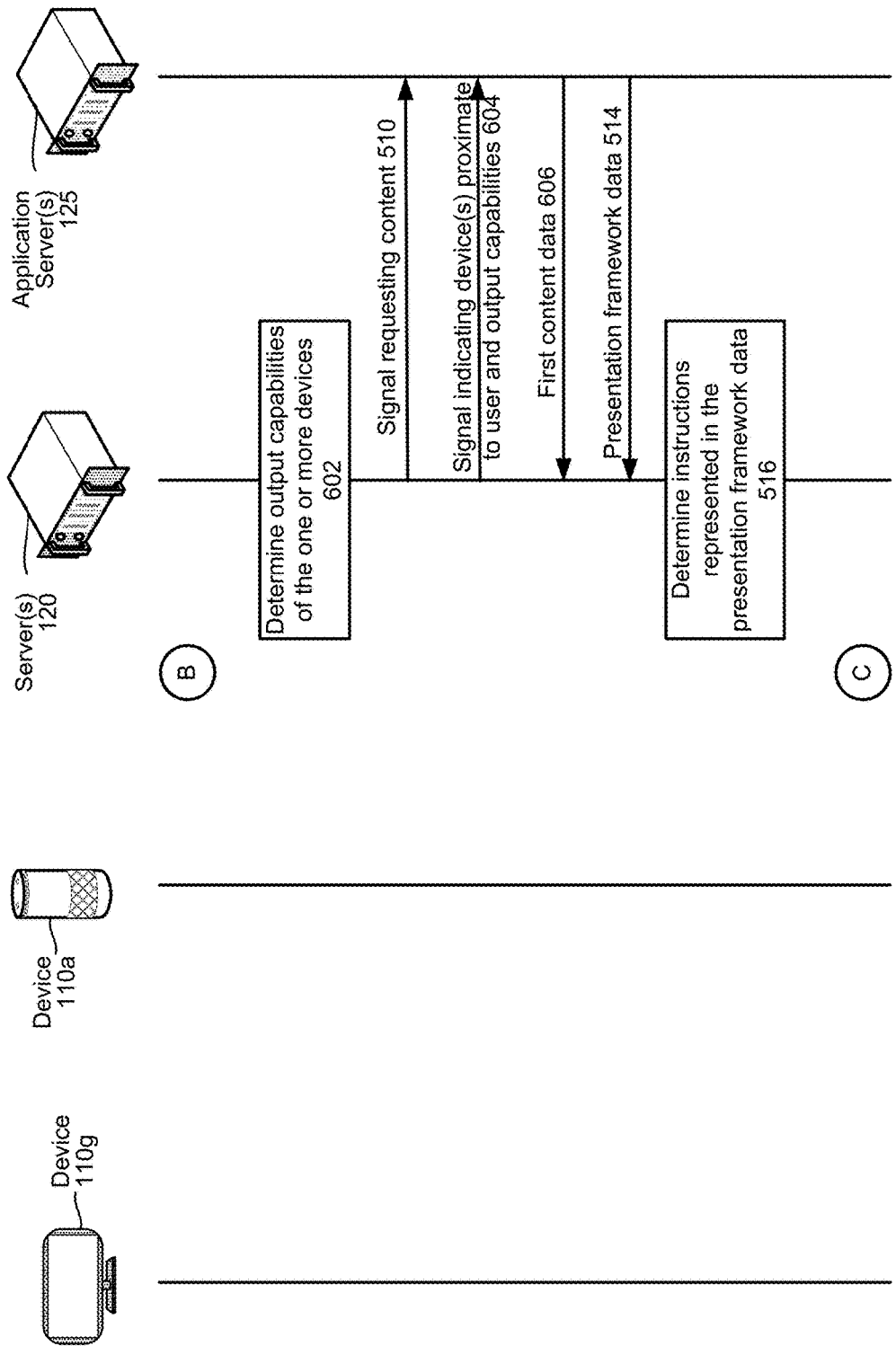

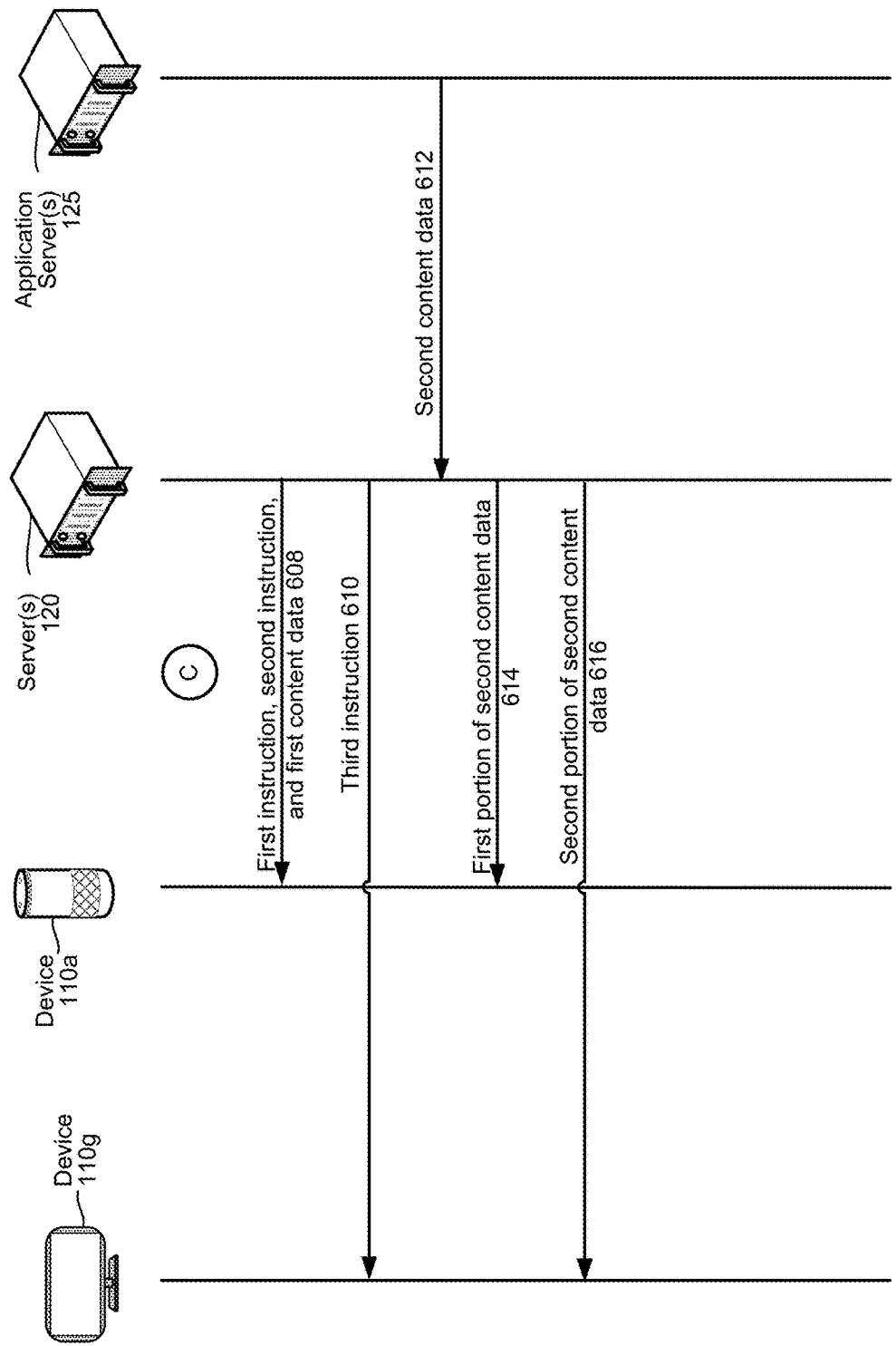

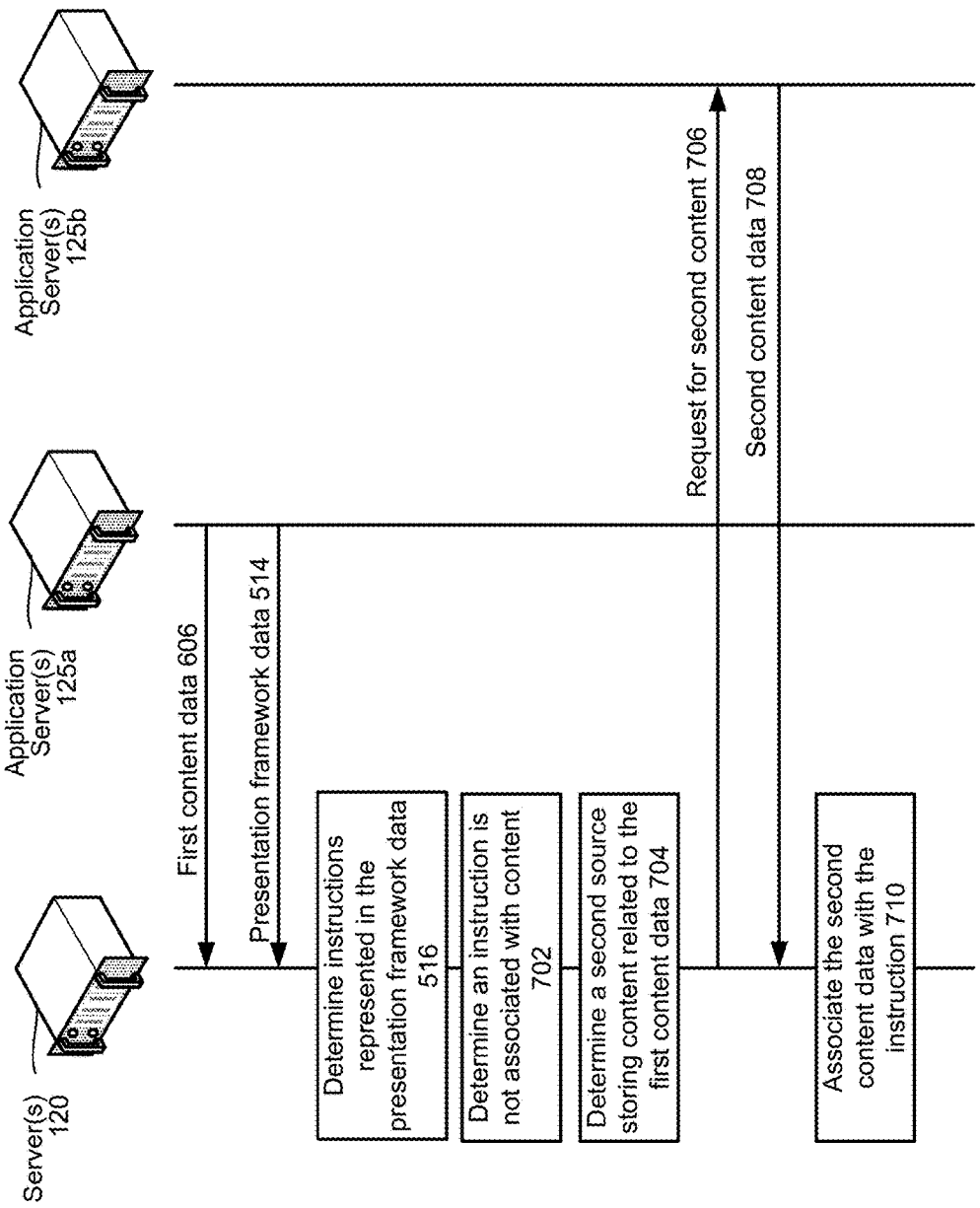

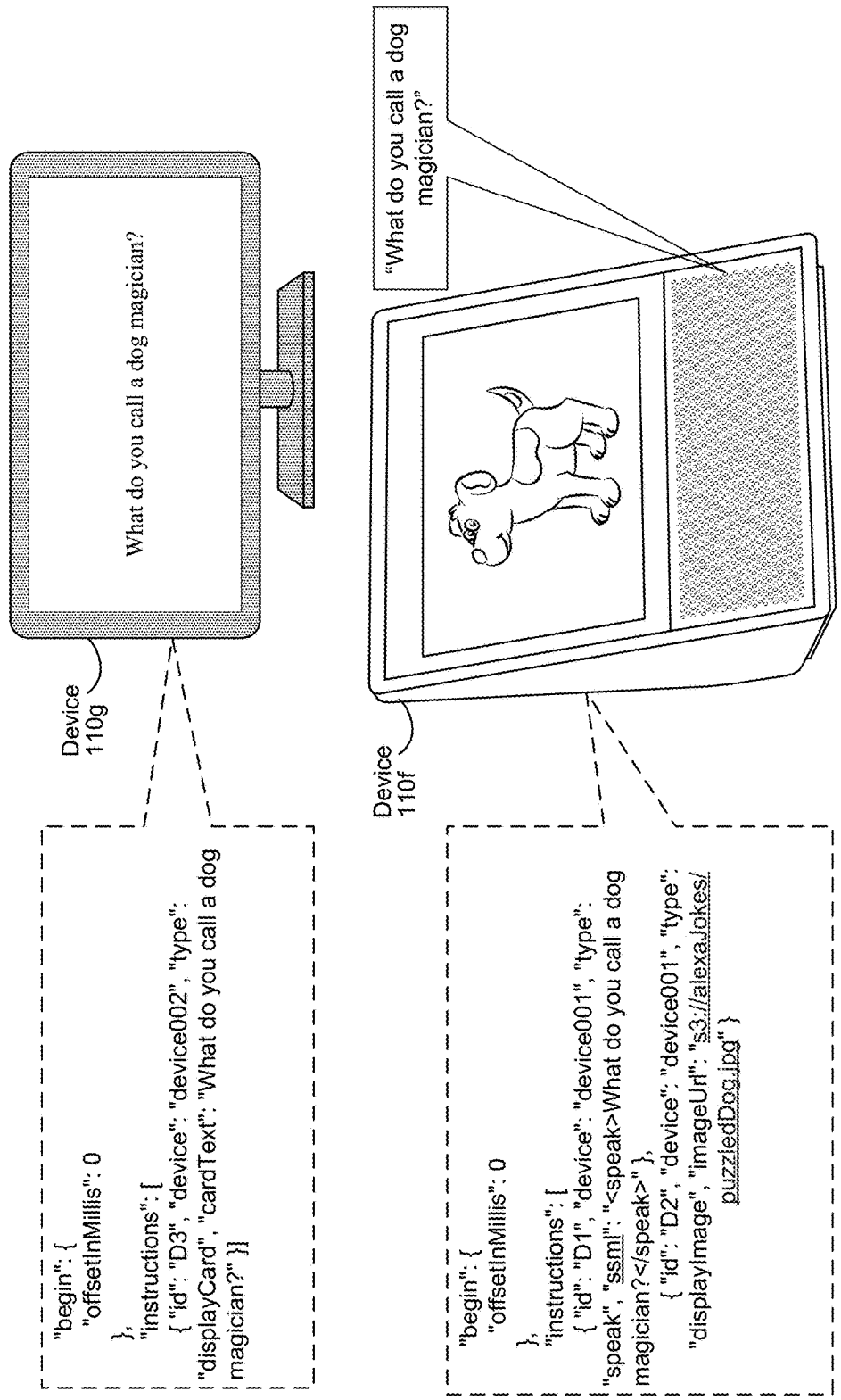

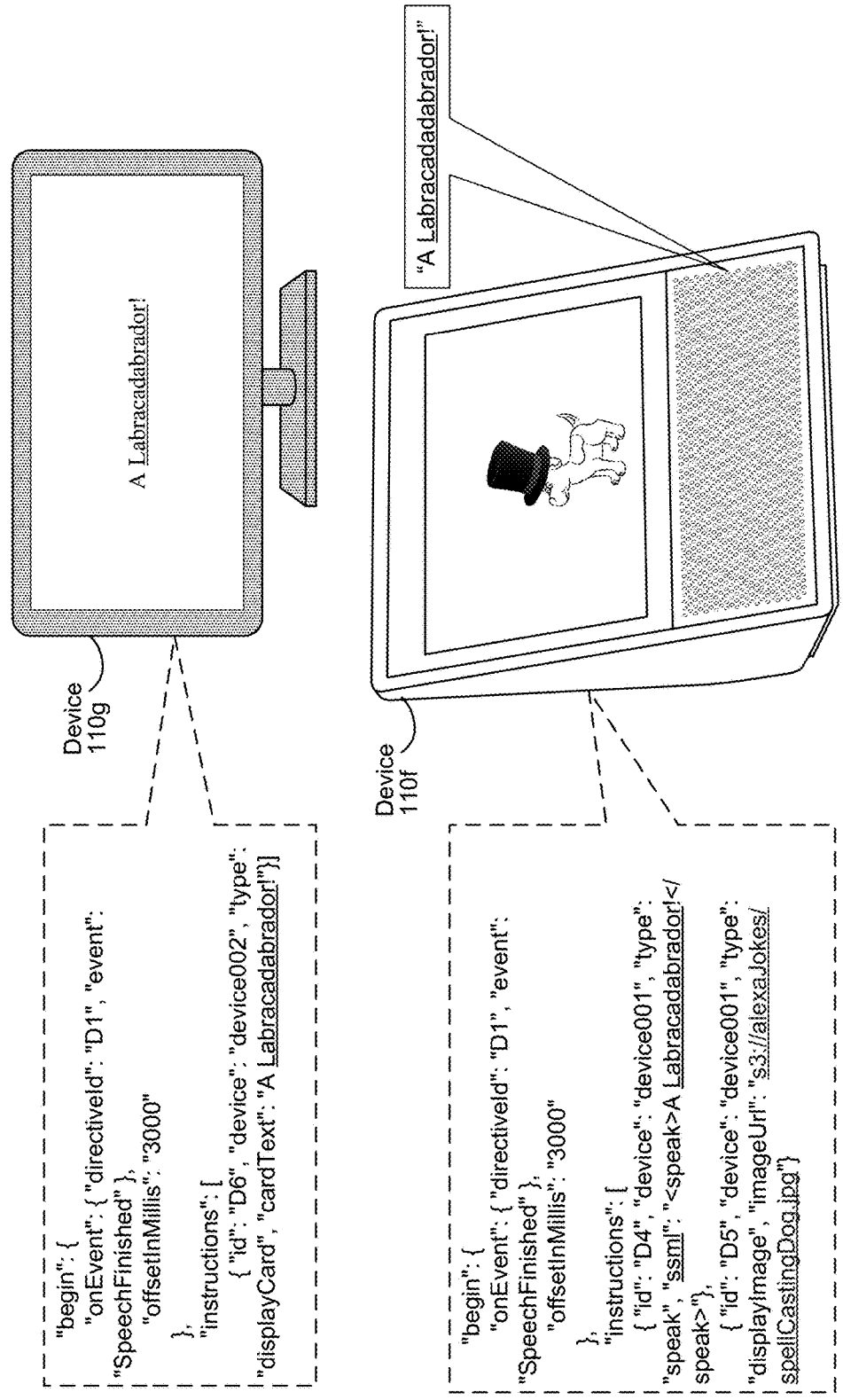

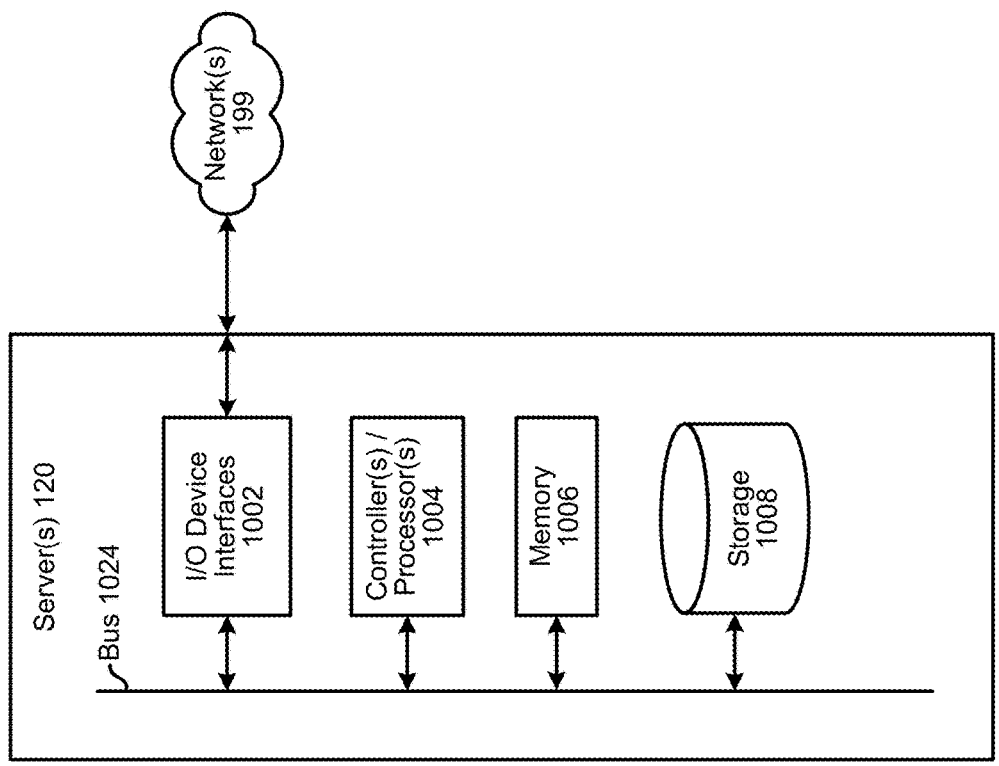

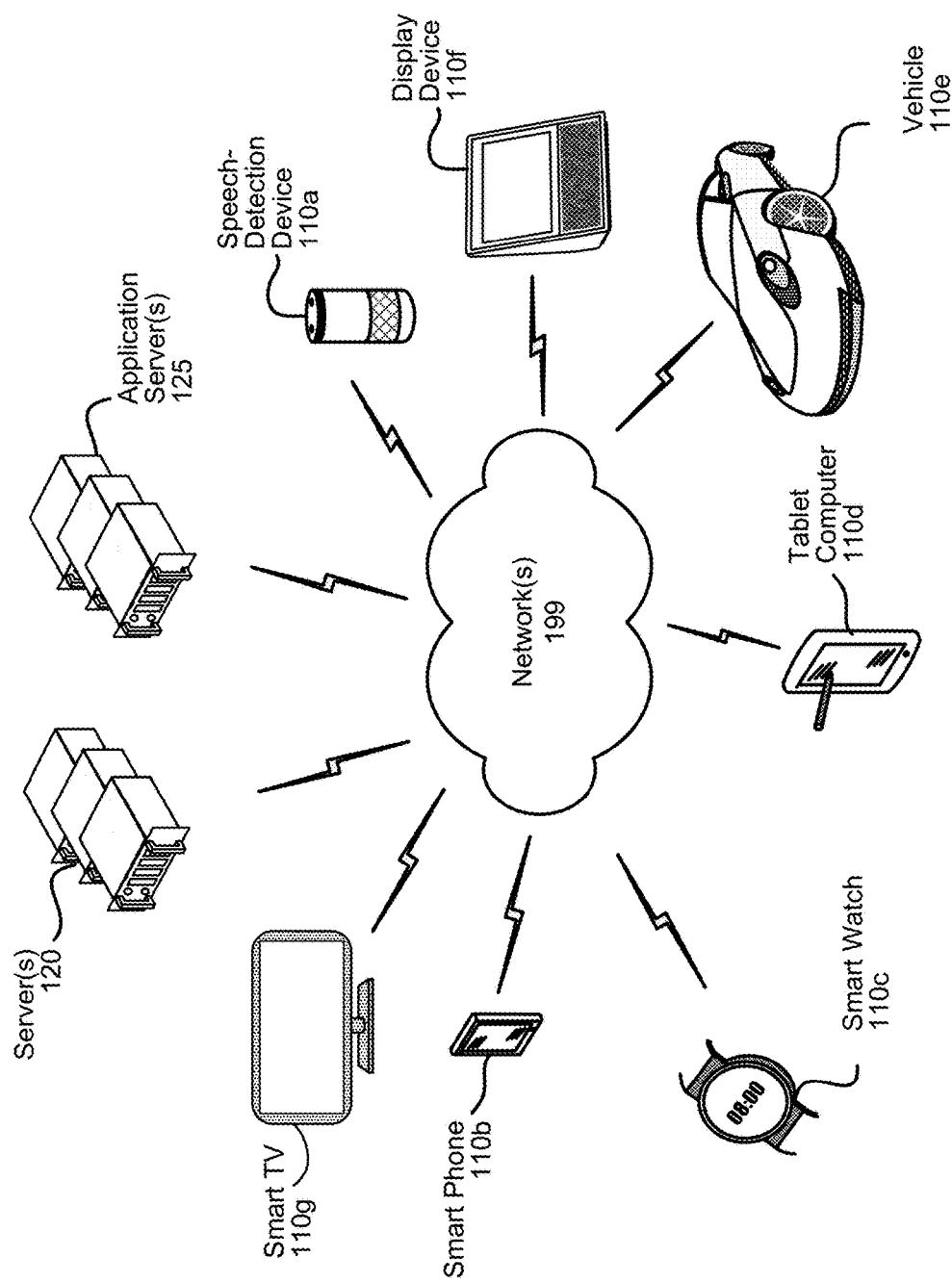

MULTI-MODALITY PRESENTATION AND EXECUTION ENGINE

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 4 illustrates an example presentation framework with various instructions according to embodiments of the present disclosure.

FIGS. 5A and 5B are a signal flow diagram illustrating the output of content by a single device based on a fully populated presentation framework according to embodiments of the present disclosure.

FIGS. 6A through 6C are a signal flow diagram illustrating the output of content by multiple devices based on a partially populated presentation framework according to embodiments of the present disclosure.

FIG. 7 is a signal flow diagram illustrating the server(s) supplementing a partially populated presentation framework according to embodiments of the present disclosure.

FIGS. 8A and 8B illustrate an example of a synchronous output of multi-modal content across multiple devices based on a presentation framework according to embodiments of the present disclosure.

FIG. 10 is a block diagram conceptually illustrating example components of a server according to embodiments of the present disclosure.

FIG. 11 illustrates an example of a computer network for use with the speech processing system.

DETAILED DESCRIPTION

Figure 1:
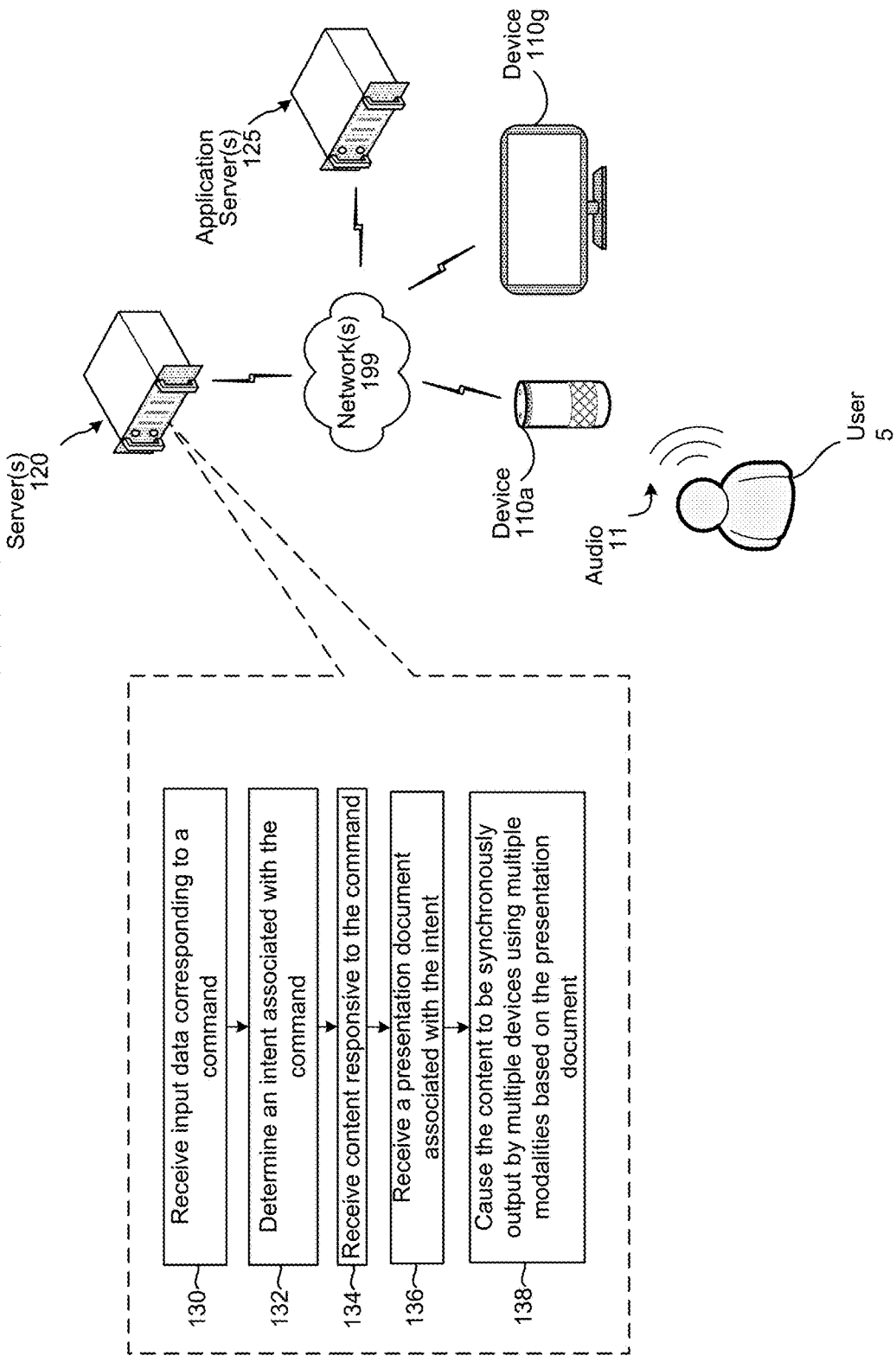
FIG. 1 illustrates a system configured to synchronously present content across multiple modalities according to embodiments of the present disclosure.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language. Text-to-speech (TTS) is a field of computer science, artificial intelligence, and linguistics concerned with enabling computers to output synthesized speech. ASR, NLU, and TTS may be used together as part of a speech processing system.

A computing system may execute user commands (e.g., spoken commands or typed commands). Such commands may request search results, the output of music or video, the booking of a ticket, etc. The computing system may include various applications configured to provide content responsive to a command.

Each application may include multiple kinds of content responsive to a given command. For example, for a command of "play Adele's latest album," an application may include audio corresponding to Adele's latest album as well as visual content corresponding to the album's cover and/or lyrics of the songs on the album.

Present systems are enabled to output content responsive to a command. However, such output may be limited to the system's configurations. For example, a system may be configured to output content using a single device local to a user. Often times, the device used to output the content is the device used by the user to input the command to the system.

The present disclosure improves present systems by enabling a system to synchronously output content using one or more devices local to a user based on a presentation framework supplied by a content source. The presentation framework may be comprised of computer code indicating, for example, the kinds of content to be output, the times portions of content should be output relative to other portions of content, the device(s) that should output each portion of content, etc.

A system according to the present disclosure may receive a user command and may receive content responsive to the command from an application(s). The content may include various kinds of data (e.g., audio data, image data, video data, etc.). The system also receives a presentation framework from the application, with the presentation framework indicating how content responsive to the input command should be synchronously output by one or more devices. The system determines one or more devices proximate to the user, determines which of the one or more devices may be used to output content indicated in the presentation framework, and causes the one or more devices to output content in a synchronous manner. For example, for a command of "play Adele's latest album," the system may cause a first device including a speaker to output audio corresponding to a song of the album, a second device including a display to display lyrics of the song synchronously with when the lyrics of the song are output by the first device, and a third device including a separate display to display an image of the album's cover.

The teachings of the present disclosure enable a system to provide content to a user in a more synchronous and holistic manner than could be achieved previously. The teachings of the present disclosure also improve user experience in that the present disclosure provides a more immersive and robust output of content as compared to present systems.

FIG. 1 illustrates a system configured to synchronously present content across multiple modalities. Although the figures and discussion illustrate certain operational steps of the system in a particular order, the steps described may be performed in a different order (as well as certain steps removed or added) without departing from the intent of the disclosure. As illustrated in FIG. 1, devices (110a/110g) local to a user 5, one or more servers 120, and one or more application servers 125 may be connected across one or more networks 199. The server(s) 120 (which may be one or more different physical devices) may be capable of performing traditional speech processing (e.g., speech recognition processing such as ASR, natural language processing such as NLU, command processing, etc.) as well as other operations. A single server 120 may perform all speech processing or multiple servers 120 may combine to perform all speech processing. Further, the server(s) 120 may execute certain commands, such as answering spoken utterances of users 5 and operating other devices (e.g., light switches, appliances, etc.).

As illustrated in FIG. 1, a device 110a may capture audio 11 including a spoken utterance of a user 5 via a microphone or microphone array of the device 110a. The device 110a may generate audio data corresponding to the captured audio 11, and send the audio data to the server(s) 120 as input data for processing. Alternatively, the user 5 may input (via a keyboard) text into a device. Text data corresponding to the text may then be sent to the server(s) 120 as input data for processing. Both the spoken utterance and the input text may correspond to a command for the user to execute a function, such as return search results, play music, etc.

The server(s) 120 receives (130) the input data and determines (132) an intent of the user command represented in the input data. If the input data is audio data, the server(s) 120 may perform speech recognition processing on the input data to generate text data. The server(s) 120 may perform natural language processing on the text data (either generated by speech recognition processing or received from a device) to determine the intent. For example, for a command of "play Adele's latest album," the server(s) 120 may determine an intent of <PlayMusic>.

The server(s) 120 may be configured to determine various intents. Each intent may be associated with a different application. The server(s) 120 may receive (134) content responsive to the command from an application server(s) 125. For the example above, an application server(s) 125 associated with the <PlayMusic> intent may be a multimedia streaming service that stores audio data corresponding to music, image data corresponding to album covers, and video data corresponding to song lyrics.

The server(s) 120 also receives (136) a presentation framework associated with the intent from the application server(s) 125. The presentation framework indicates how content should be output across devices associated with multiple modalities, while remaining device agnostic. For example, a presentation framework may indicate a first portion of content, a second portion of content, and a third portion of content. A presentation framework may additionally indicate a sequence in which the portions of content should be output. For example, a presentation framework may indicate the first portion of content (e.g., corresponding to TTS generated audio data) should be output at time=0, and the second content (e.g., audio data corresponding to lyrics of a song) and third content (e.g., video data corresponding to lyrics of the song) should be output synchronously once the first portion of content is finished being output. A presentation framework may further indicate the modality in which each portion of content should be output, while remaining agnostic as to the particular device(s) used to output the portions of content. For example, a presentation framework may indicate the first portion of content should be output by a device including at least a medium quality speaker, the second portion of content should be output by a device including a high quality speaker, and the third portion of content should be output by a device including a display (with or without designating a threshold resolution of the display).

Since the presentation framework remains device agnostic (i.e., the presentation framework does not dictate the exact device or device type that should output content), the server(s) 120 determines the devices to output portions of content. The server(s) 120 may use proximity determinations to determine which devices are local to a user (as described herein). Once the server(s) determines the devices local to the user 5, the server(s) 120 causes (138) the content to be synchronously output by multiple devices local to the user 5 using multiple modalities based on the presentation framework. For example, for the command of "play Adele's latest album," the server(s) 120 may cause a device 110a to output lyrics of songs and may cause a device 110g to synchronously display lyrics to the songs as they are output by the device 110a.

Figure 2:
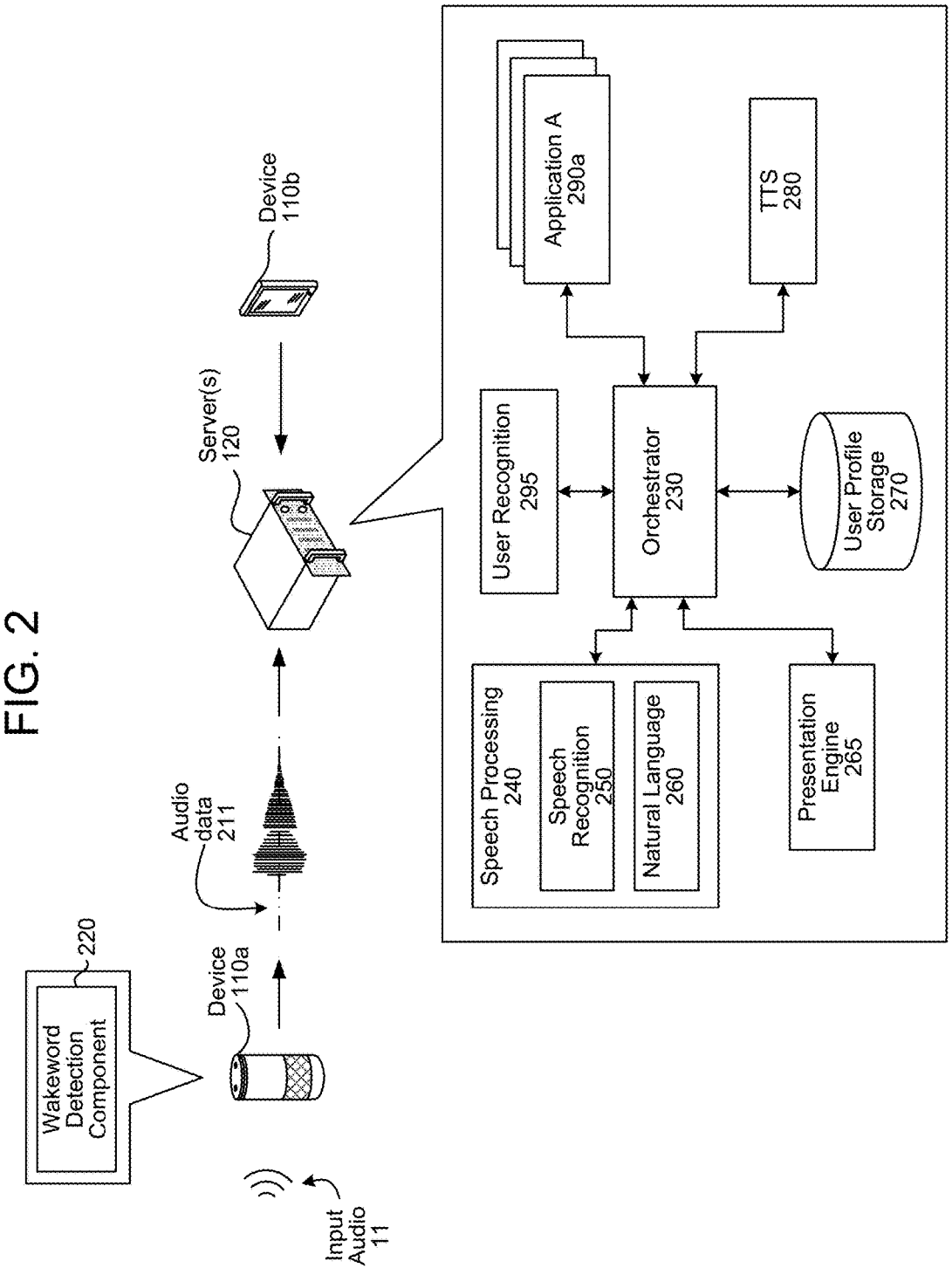
FIG. 2 is a diagram of components of a system according to embodiments of the present disclosure.

The system may operate using various components as described in FIG. 2. The various components illustrated FIG. 2 may be located on a same or different physical devices. Communication between various components illustrated in FIG. 2 may occur directly or across a network(s) 199.

An audio capture component, such as a microphone or array of microphones of the device 110a or other device, captures the input audio 11 corresponding to a spoken utterance. The device 110a, using a wakeword detection component 220, processes audio data corresponding to the input audio 11 to determine if a keyword (e.g., a wakeword) is detected in the audio data. Following detection of a wakeword, the device 110a sends audio data 211, corresponding to the utterance, to a server(s) 120 for processing.

Upon receipt by the server(s) 120, the audio data 211 may be sent to an orchestrator component 230. The orchestrator component 230 may include memory and logic that enables the orchestrator component 230 to transmit various pieces and forms of data to various components of the system.

The orchestrator component 230 sends the audio data 211 to a speech processing component 240. A speech recognition component 250 of the speech processing component 240 transcribes the audio data 211 into one more textual interpretations representing speech contained in the audio data 211. The speech recognition component 250 interprets the spoken utterance based on a similarity between the spoken utterance and pre-established language models. For example, the speech recognition component 250 may compare the audio data 211 with models for sounds (e.g., subword units or phonemes) and sequences of sounds to identify words that match the sequence of sounds spoken in the utterance represented in the audio data 211.

Alternatively, a keyboard (e.g., presented on a touch sensitive display) of a device 110b may capture textual input corresponding to a user command. The device 110b may generate text data corresponding to the input text, and may send the text data to the server(s) 120. Upon receive by the server(s) 120, the text data may be sent to the orchestrator component 230.

The orchestrator component 230 sends the text data to a natural language component 260 of the speech processing component 240. If the user command was received by the server(s) 120 as audio data from the device 110a, the speech recognition component 250 sends text data generated using speech recognition processing to the natural language component 260. The text data sent from the speech recognition component 250 to the natural language component 260 may include a top scoring textual interpretation of the spoken utterance or may include an N-best list including a group of textual interpretations and potentially their respective scores.

The natural language component 260 attempts to make a semantic interpretation of the phrases or statements represented in the text data. That is, the natural language component 260 determines one or more meanings associated with the phrases or statements represented in the text data based on individual words represented in the text data. The natural language component 260 interprets a text string to derive an intent of the user command represented in the text data (e.g., an action that the user desires be performed) as well as pertinent pieces of information in the text data that allow a device (e.g., the device 110a, the device 110g, the server(s) 120, the application server(s) 125, etc.) to complete the intent. For example, if the text data corresponds to "call mom," the natural language component 260 may determine the user intended to activate a telephone in his/her device and to initiate a call with a contact matching the entity "mom."

The server(s) 120 may include a user recognition component 295. The user recognition component 295 may take as input the audio data 211, the text data received by the server(s) 120 from the device 110b, and/or the text data output by the speech recognition component 250. The user recognition component 295 determines scores indicating whether the command represented in the audio data 211 or the text data provided by the device 110b originated from particular users. For example, a first score may indicate a likelihood that the command originated from a first user, a second score may indicate a likelihood that the command originated from a second user, etc. The user recognition component 295 also determines an overall confidence regarding the accuracy of user recognition operations. If the user command is received as audio data 211, user recognition may involve comparing speech characteristics in the audio data 211 to stored speech characteristics of users. User recognition may also involve comparing biometric data (e.g., fingerprint data, iris data, etc.) received by the user recognition component 295 to stored biometric data of users. User recognition may further involve comparing image data including a representation of at least a feature of a user with stored image data including representations of features of users. Other types of user recognition processes, including those known in the art, may also or alternatively be used. Output of the user recognition component 295 may be used to inform natural language processing as well as processing performed by applications 290 (as well as applications operated by the application server(s) 125).

The server(s) 120 may include a user profile storage 270. The user profile storage 270 includes data regarding user accounts. As illustrated, the user profile storage 270 is implemented as part of the server(s) 120. However, it should be appreciated that the user profile storage 270 may be located proximate to the server(s) 120, or may otherwise be in communication with the server(s) 120, for example over the network(s) 199. The user profile storage 270 may include a variety of information related to individual users, accounts, etc. that interact with the system.

The orchestrator component 230 may send output from the natural language component 260 (e.g., text data including tags attributing meaning to the words and phrases represented in the text data), and optionally output from the user recognition component 295 and/or data from the user profile storage 270, to one or more applications 290. FIG. 2 illustrates various applications 290 maintained and/or operated by the server(s) 120. However, it should be appreciated that the data sent to the applications 290 may also be sent to application servers 125 executing applications.

An "application," as used herein, may be considered synonymous with a skill. A "skill" may correspond to a domain and may be software running on a server(s) 120 that is akin to an application. That is, a skill may enable a server(s) 120 or application server(s) 125 to execute specific functionality in order to provide data or produce some other output requested by a user. The system may be configured with more than one skill. For example a weather service skill may enable the server(s) 120 to execute a command with respect to a weather service server(s) 125, a car service skill may enable the server(s) 120 to execute a command with respect to a taxi or ride sharing service server(s) 125, an order pizza skill may enable the server(s) 120 to execute a command with respect to a restaurant server(s) 125, etc.

The application 290 to which the orchestrator component 230 sends data may be chosen based on the output of the natural language component 260. In an example, if the natural language component 260 outputs text data associated with an intent to play music, the application 290 selected may correspond to a music playing application. In another example, if the natural language component 260 outputs text data associated with an intent to output weather information, the application 290 selected may correspond to a weather application. In yet another example, if the natural language component 260 outputs text data associated with an intent to obtain search results, the application 290 selected may correspond to a search engine application.

An application 290 may output text data to the server(s) 120. The orchestrator component 230 may send text data output by the application 290 to a TTS component 280. The TTS component 280 may synthesize speech corresponding to received text data. Audio data synthesized by the TTS component 280 may be sent to the device 110a (or another device including a speaker) for output to a user.

The TTS component 280 may perform speech synthesis using one or more different methods. In one method of synthesis called unit selection, the TTS component 280 matches text data or a derivative thereof against a database of recorded speech. Matching units are selected and concatenated together to form audio data. In another method of synthesis called parametric synthesis, parameters such as frequency, volume, and noise are varied by the TTS component 280 to create an artificial speech waveform output. Parametric synthesis uses a computerized voice generator, sometimes called a vocoder.

The server(s) 120 may additionally include a presentation engine 265 configured to process presentation frameworks and cause content to be synchronously output across multiple modalities and devices as described herein.

Figure 3:
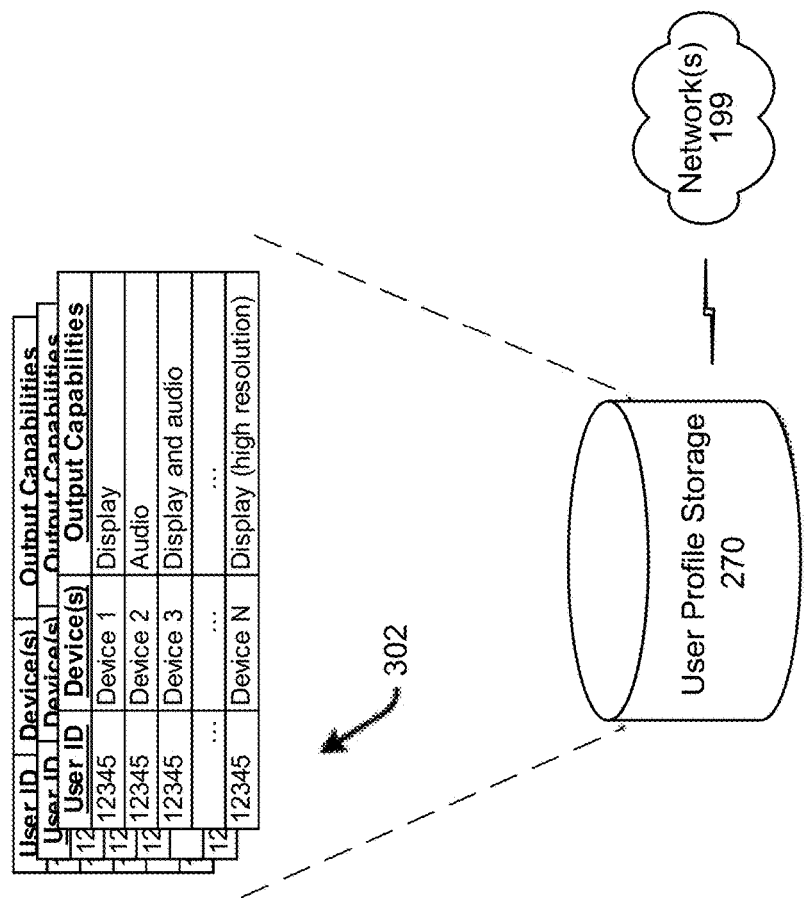
FIG. 3 illustrates data stored and associated with user profiles according to embodiments of the present disclosure.

FIG. 3 illustrates the user profile storage 270 that includes data regarding user accounts 302. For illustration, as shown in FIG. 3, each user profile 302 may include data indicating the different devices associated with the profile as well as the output capabilities of each device. Each user profile 302 may additionally include other data not explicitly illustrated.

FIG. 4 illustrates an example presentation framework. A presentation framework may include a batch of instructions associated with a specific intent as well as details on how the directives should be synchronized. That is, a presentation framework may contain all the information needed to present content to a user spanning multiple modalities and/or devices. An instruction may include output parameters. Output parameters may include information such as timing information (e.g., indicating when first content should be output with respect to other content), output device requirements (e.g., display, speaker, etc.), user presence dependency, etc. The presentation framework may also include trigger data indicating when certain portions of content are to be output by a particular device. The trigger data may include time information and may be associated with a particular portion of content, a particular device, etc. For example, the presentation framework data may include first trigger data indicating at least one first condition when the first portion of content data is to be output, second trigger data indicating at least one second condition when the second portion of content data is to be output, etc.

Each instruction in the presentation framework may be associated with a "begin" indication representing when commencement of output of content associated with the instruction should be initiated. As illustrated, a first instruction, a second instruction, and a third instruction (collectively represented as 402) are associated with a begin indication 404 representing content associated with the first instruction, content associated with the second instruction, and content associated with the third instruction should be output as soon as the content is obtained or generated (as represented by "offsetInMillis": 0 in FIG. 4). As also illustrated, a fourth instruction, a fifth instruction, and a sixth instruction (collectively represented as 406) are associated with a begin indication 408 representing content associated with the fourth instruction, content associated with the fifth instruction, and content associated with the sixth instruction should be output once the first content associated with the first instruction is finished being output (as represented by "onEvent": {"directiveId": "D1", "event": "SpeechFinished"} in FIG. 4).

Each instruction may be associated with a unique identifier (ID). As illustrated, for example, the first instruction is associated with a unique ID corresponding to D1, the second instruction is associated with a unique ID corresponding to D2, the third instruction is associated with a unique ID corresponding to D3, the fourth instruction is associated with a unique ID corresponding to D4, the fifth instruction is associated with a unique ID corresponding to D5, and the sixth instruction is associated with a unique ID corresponding to D6.

Each instruction may also indicate the device that should output the content associated with the instruction. For example, as illustrated, a device having a unique ID corresponding to device001 may output content associated with the first instruction, the second instruction, the fourth instruction, and the fifth instruction. As further illustrated, a device having a unique ID corresponding to device002 may output content associated with the third instruction and the sixth instruction. The server(s) 120, as described herein below, may determine the devices proximate to the user, determine the output capabilities of the devices, and send data indicating the devices' unique IDs and output capabilities to the application server(s) 125. The application server(s) 125 may populate the presentation framework with the devices' unique IDs where appropriate. That is, the application server(s) 125 may determine, based on output capabilities, which devices should output which content associated with the presentation framework, and populate instructions of the presentation framework with device unique IDs associated with devices that should output content associated with the instructions.

Each instruction may also include an indication of how content should be output as well as the substance of the content. For example, as illustrated, the first instruction may indicate audio corresponding to TTS audio data should be output, the second instruction may indicate an image corresponding to image data should be displayed, the third instruction may indicate an image corresponding to image data should be displayed, the fourth instruction may indicate audio corresponding to TTS audio data should be output, the fifth instruction may indicate an image corresponding to image data should be displayed, and the sixth instruction may indicate an image corresponding to image data should be displayed.

A single device may include output capabilities that enable the single device to output content associated with all of the instructions represented in in presentation framework. A presentation framework may be fully populated when the server(s) 120 receives presentation framework data corresponding to the presentation framework. A presentation framework may be considered fully populated if all instructions of the presentation framework refer to content data received concurrently with or prior to the presentation framework data by the server(s) 120. For example, if a presentation framework includes three instructions, the presentation framework may be considered fully populated if all the three instruction refer to content data already or concurrently received by the server(s) 120.

FIGS. 5A and 5B illustrate the output of content by a single device based on a fully populated presentation framework. A device 110f may receive (502) input audio corresponding to an utterance. The device 110f may generate input audio data corresponding to the input audio and may send (504) the input audio data to the server(s) 120 for processing. The server(s) 120 may perform (506) speech recognition processing on the input audio data to generate input text data.

Alternatively, the device 110f may receive input text corresponding to a command. The device 110f may generate input text data corresponding to the input text and may send the input text data to the server(s) 120 for processing.

The server(s) 120 performs (508) natural language processing on the input text data (either generated by speech recognition processing or received from the device 110a or other device) to determine a command represented in the input text data. For example, the server(s) 120 may determine a command corresponding to "play Adele's latest album" is associated with a <PlayMusic> intent. For further example, the server(s) 120 may determine a command corresponding to "book me a ticket to Seattle" is associated with a <BookPlaneTicket> intent.

The server(s) 120 sends (510) a signal requesting content responsive to the command to an application server(s) 125 associated with the intent. In response, the server(s) 120 receives (512) content data from the application server(s) 125. The content data may include one or more different media types, such as audio data, video data, image data, etc.

The server(s) 120 also receives (514) presentation framework data from the application server(s) 125 from which the server(s) 120 received the content data. The server(s) 120 may receive the content data and the presentation framework data in a single transmission, or in separate transmissions (as illustrated in FIGS. 5A and 5B). Since the server(s) 120 did not determine devices proximate to a user (as described herein) prior to sending the request for content to the application server(s) 125, the presentation framework data may include a presentation framework that includes instructions that each simply indicate the output capabilities of the device that should be used to output content associated with the instructions. That is, instead of indicating a specific device ID with a specific instruction (as described with respect to and illustrated in FIG. 4, the presentation framework may indicate the output capability (e.g., speaker, display, etc.) of a device that should be used to output content associated with the instruction.

As indicated above, the server(s) 120 did not send device output capabilities and device IDs to the application server(s) 125 prior to receiving the presentation framework data (as illustrated in FIGS. 5A and 5B). Thus, after receiving the presentation framework data, the server(s) 120 determines (516) instructions represented in the presentation framework data, determines (518) one or more devices proximate to a user, and determines (520) one or more of the one or more devices to be used to output content according to the instructions.

A user, and more particularly a profile associated with the user, may be associated with multiple devices. Each of the devices may be located in a different location, for example different rooms of the user's house, the user's work, etc. Thus, the server(s) 120 may determine the one or more devices proximate to the user by determining a user within a hearing distance of a device, within eye sight of a device, or within any other distance that enables the user to intake content output by a device. Determining devices proximate the user may include determining which of the devices associated with the user are presently outputting presence indicators representing the devices are detecting a user.

Each of the devices associated with the user may be configured to receive a stream of data. Moreover, each of the devices may be configured to analyze a stream of data to determine whether a user is proximate to the device. For example, a device associated with or including a camera may be configured to receive a stream of images and process image data corresponding thereto to detect representations of users. A user represented in the image data may be considered proximate to the device. For further example, a device associated with or including a microphone may be configured to receive a stream of audio and process audio data corresponding thereto to detect speech. A user whose speech is represented in the audio data may be considered proximate to the device. In some instances, the system may determine the exact user whose speech is represented in the audio data. In such a case, the device may compare the speech in audio data to stored speech of users to determine the user. When a device detects a user is proximate thereto, the device may send an indication of such to the server(s) 120.

As illustrated in FIGS. 5A and 5B, the server(s) 120 may determine a single device including a speaker and a display may output content associated with all of the instructions represented in the presentation framework data. For example, the presentation framework data may include a first instruction associated with the output of TTS generated audio data (either forming a portion of the content data received from the application server(s) 125 or generated by the server(s) 120), a second instruction associated with the output of non-TTS generated audio data (forming a portion of the content data received from the application server(s) 125), and a third instruction associated with the output of image data or video data (forming a portion of the content data received from the application server(s) 125). The server(s) 120 may determine the device 110f is both proximate to the user as well as capable of outputting content associated with all the instructions represented in the presentation framework data (e.g., the first instruction, the second instruction, and the third instruction.

Upon determining the device 110f is capable of and best suited to output all content associated with all instructions in the presentation framework data, the server(s) 120 sends (522) the entirety of the content data and the entirety of the presentation framework data to the device 110f. The device 110 then outputs (524) content represented in the content data according to instructions represented in the presentation framework data. According to the above example, the device 110f may output first content corresponding to a first portion of the content data as directed by the first instruction, may output second content corresponding to a second portion of the content data as directed by the second instruction, and may output third content corresponding to a third portion of the content data as directed by the third instruction.

A device 110 may queue a portion of a presentation framework until the device 110 is to output content as indicated by an instruction in the portion of the presentation framework. The device 110 may also buffer output content if the device 110 receives the output content from the server(s) 120 prior to a time when the device 110 is to output the output content according the instruction.

Multiple devices may be required to output content associated with instructions in a single presentation framework. For example, the presentation framework may include a first instruction to output audio and a second instruction to display an image and/or text. A first device 110a may be configured with a speaker, but not a display. Therefore, a second device 110g including a display would be required to display the text and/or image according to the second instruction.

A presentation framework may be partially populated when the server(s) 120 receives presentation framework data corresponding to the presentation framework. That is, the presentation framework data may include a partially populated presentation framework that includes "promises." A promise corresponds to an instruction associated with content data that is provided by the application server(s) 125 to the server(s) 120 at a later time than the content data originally sent with the presentation framework data. For example, presentation framework data may include a first instruction associated with the output of TTS speech and a second instruction associated with the output of music to be output after the TTS speech is output. Content data corresponding to the TTS speech (or text data to be converted by the TTS component 280 of the server(s) 120) may be sent with the presentation framework data while content data corresponding to the music may not be sent with the presentation framework data. The content data corresponding to the music may be sent by the application server(s) 125 to the server(s) 120 sometime after the presentation framework data but prior to the TTS speech being completely output by the system. Thus, the second instruction in the aforementioned example may be considered a promise.

FIGS. 6A through 6C illustrate the output of content by multiple devices based on a partially populated presentation framework. A device 110a receives (502) input audio corresponding to an utterance. The device 110a may generate input audio data corresponding to the input audio and may send (504) the input audio data to the server(s) 120 for processing.

The server(s) 120 performs (506) speech recognition processing on the input audio data to generate input text data. The server(s) 120 performs (508) natural language processing on the input text data (either generated by speech recognition processing or as received from a device) to determine a command represented in the input text data.

Prior to sending a request for content to the application server(s) 125 associated with the intent, the server(s) 120 determines (518) one or more devices proximate to a user. The server(s) 120 determines (602) the output capabilities of the one or more devices proximate to the user. The server(s) 120 sends (510) a signal requesting content to the application server(s) 125. The server(s) 120 also sends (604) a signal indicating the one or more devices proximate to the user and their respective output capabilities to the application server(s) 125. The signal may include the unique ID of each device proximate to the user.

The server(s) 120 receives (606) first content data from the application server(s) 125. The server(s) 120 also receives (514) presentation framework data from the application server(s) 125. As indicated above, the presentation framework data may include one or more promises (e.g., one or more instructions associated with content data not represented in the content data already sent by the application server(s) 125 to the server(s) 120. Moreover, since the server(s) 120 sent the application server(s) 125 data indicating the one or more device(s) proximate to the user as well as their output capabilities, the instructions represented in the presentation framework data may indicate specific devices to output content associated with the instructions. For example, each instruction may indicate the unique ID of the device proximate to the user that should be used to output content associated with the instruction. Alternatively, the instructions may simply indicating the output capabilities of the device that should output content associated with each respective instruction.

The server(s) 120 determines (516) instructions represented in the presentation framework data. For example, the server(s) 120 may determine the presentation framework data includes a first instruction to output TTS generated audio, a second instruction to output non-TTS audio, and a third instruction to display one or more images. The first instruction may indicate the device 110a should output the TTS generated audio. The second instruction may indicate the device 110 should output the non-TTS generated audio. The third instruction may indicating the device 110g should display the one or more images.

The server(s) 120 sends instructions and portions of the first content data to respective devices indicated in the instructions. That is, the server(s) 120 sends instructions and portions of the first content data to devices according to their output capabilities. The presentation framework data may indicate the device 110a should completely output the TTS generated audio associated with the first instruction prior to the device 110a beginning output of the non-TTS generated audio as well as prior to the device 110g beginning display of the one or more images. According to the aforementioned, the server(s) 120 sends (608) portions of the presentation framework data corresponding to the first instruction and the second instruction as well as the first content data to the device 110a. The server(s) 120 also sends (610) a portion of the presentation framework data corresponding to the third instruction to the device 110g.

Sometime after the application server(s) 125 sends the first content data and the presentation framework data to the server(s) 120, the application server(s) 125 sends (612) second content data corresponding to the non-TTS generated audio associated with the second instruction and the one or more images associated with the third instruction to the server(s) 120. Either prior to the device 110a completing output of content corresponding to the first content data (e.g., TTS generated speech) or as the device 110a completes output of the content, the server(s) 120 sends (614) a first portion of the second content data (e.g., the non-TTS generated audio) to the device 110a as well as sends (616) a second portion of the second content data (e.g., the one or more images) to the device 110g. Upon the device 110a completing output of content corresponding to the first content data, the device 110a outputs the non-TTS generated audio and the device 110g simultaneously displays the one or more images.

As described, a partially populated presentation framework including one or more promises may be sent from an application server(s) 125 to the server(s) 120. A partially populated presentation framework may also or alternatively include one or more unpopulated instructions that allow the server(s) 120 to supplement the content received from the application server(s) with content from another application server(s).

FIG. 7 illustrates the server(s) 120 supplementing a partially populated presentation framework. The server(s) 120 receives (606) the first content data from an application server(s) 125a. The server(s) 120 also receives (514) presentation framework data from the application server(s) 125a from which the server(s) 120 received the first content data.

The server(s) 120 determines (516) instructions represented in the presentation framework data. The server(s) 120 also determines (702) one of the instructions is not associated with content. That is, the server(s) 120 determines an instruction that is neither associated with at least a portion of the first content data nor a promise. The instruction that is not associated with content may explicitly indicate the server(s) 120 may associate related content with the instruction.

The server(s) 120 determines (704) a second source (e.g., an application server(s) 125b other than the application server(s) 125a) storing content related to the first content data. For example, the first content data may corresponding to music of an artist and the second source may store content relating to concert locations, times, venues, etc.

The server(s) 120 sends (706) a request for second content to the application server(s) 125b. The request may include information indicating at least a portion of the first content data and/or at least a portion of the natural language processing results performed at step 508 illustrated in FIG. 5A. The server(s) 120 thereafter receives (708) second content data from the application server(s) 125b.

The server(s) 125b associates (710) the second content data with the instruction that was originally not associated with content. The server(s) 120 causes one or more devices to output content corresponding to the instructions represented in the presentation framework data as described with respect to FIGS. 5A-5B and/or 6A-6C above.

FIGS. 8A and 8B illustrate an example of a synchronous output of multi-modal content across multiple devices based on a presentation framework. A user may input a command (e.g., a spoken command or a text based command) corresponding to "tell me a joke." In response, the presentation framework illustrated in FIG. 4 may cause a device 110f to output TTS generated audio corresponding to "what do you call a dog magician," while causing the device 110f to simultaneously display an image of a dog, while causing a device 110g to simultaneously display text corresponding to "what do you call a dog magician" (as illustrated in FIG. 8A). FIG. 8A further illustrates the instructions and other portions of the example presentation framework illustrated in FIG. 4 that cause the devices (110f/110g) to output content as illustrated in FIG. 8A.

Upon the device 110f completing output of audio corresponding to "what do you call a dog magician, the presentation framework illustrated in FIG. 4 may cause the device 110f to output TTS generated audio corresponding to "a labracadabrador," while causing the device 110f to simultaneously display an image of a dog wearing a magic hat, while causing a device 110g to simultaneously display text corresponding to "a labracadabrador" (as illustrated in FIG. 8B). FIG. 8B further illustrates the instructions and other portions of the example presentation framework illustrated in FIG. 4 that cause the devices (110f/110g) to output content as illustrated in FIG. 8B. Display of the output content by the devices (110g/110f) as shown in FIG. 8B may be delayed for a time period (e.g., 3 seconds) after the TTS generated audio is done being output for FIG. 8A, thus allowing a period of time between the joke (of FIG. 8A) and the punchline (of FIG. 8B). Instructions for the delay (or other timing information) may be included within the presentation framework.

Figure 9:
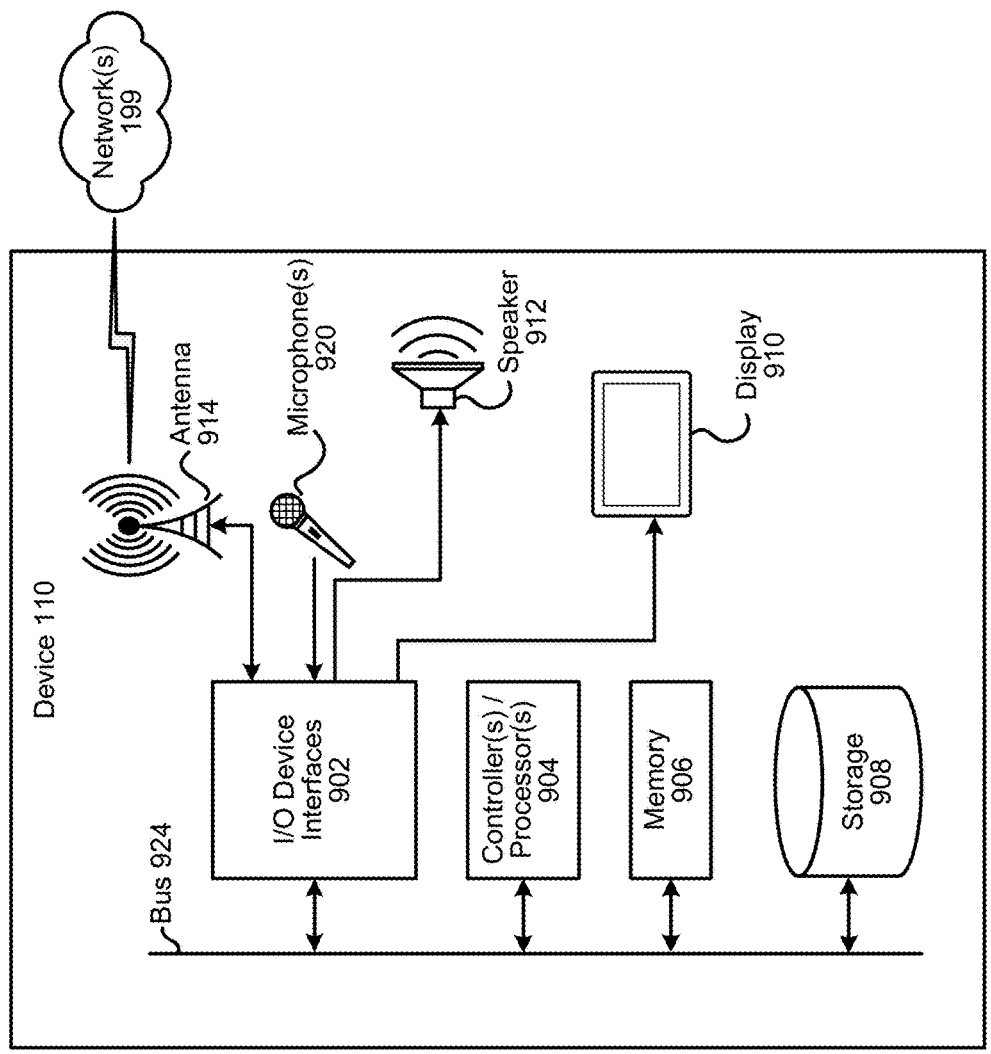
FIG. 9 is a block diagram conceptually illustrating example components of a device according to embodiments of the present disclosure.

FIG. 9 is a block diagram conceptually illustrating a user device 110 that may be used with the described system. FIG. 10 is a block diagram conceptually illustrating example components of a remote device, such as the server(s) 120 that may assist with speech recognition processing, natural language processing, or command processing. Multiple servers 120 may be included in the system, such as one server 120 for performing speech recognition processing, one server 120 for performing natural language processing, etc. In operation, each of these devices (or groups of devices) may include computer-readable and computer-executable instructions that reside on the respective device (110/120), as will be discussed further below.

Each of these devices (110/120) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (902/1002).

Computer instructions for operating each device (110/120) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120) includes input/output device interfaces (902/1002). A variety of components may be connected through the input/output device interfaces (902/1002), as will be discussed further below. Additionally, each device (110/120) may include an address/data bus (924/1024) for conveying data among components of the respective device. Each component within a device (110/120) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 912, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may further include a display 910 configured to display content.

Via antenna(s) 914, the input/output device interfaces 902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system 100 may be distributed across a networked environment. The I/O device interface (902/1002) may also include communication components that allow data to be exchanged between devices such as different physical servers in a collection of servers or other components.

The components of the device(s) 110 and the server(s) 120 may include their own dedicated processors, memory, and/or storage. Alternatively, one or more of the components of the device(s) 110 and the server(s) 120 may utilize the I/O interfaces (902/1002), processor(s) (904/1004), memory (906/1006), and/or storage (908/1008) of the device(s) 110 and server(s) 120, respectively. Thus, the speech recognition component 250 may have its own I/O interface(s), processor(s), memory, and/or storage; the natural language component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and the server(s) 120, as described herein, are exemplary, and may be located as a stand-alone device or may be included, in whole or in part, as a component of a larger device or system.

As illustrated in FIG. 11, multiple devices (110a-110g, 120, 125) may contain components of the system 100 and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, and/or a smart television may be connected to the network(s) 199 through a wireless service provider, over a WiFi or cellular network connection, or the like. Other devices are included as network-connected support devices, such as the server(s) 120, the application server(s) 125, or others. The support devices may connect to the network(s) 199 through a wired connection or wireless connection. Networked devices may capture audio using one-or-more built-in or connected microphones or other audio capture devices, with processing performed by speech recognition components, natural language components, or other components of the same device or another device connected via the network(s) 199, such as the speech recognition component 250, the natural language component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware, such as the AFE 220, which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
    receiving, from a first device associated with a user profile, input data corresponding to a command;
    sending, to at least one remote device associated with the command, a signal requesting data responsive to the command;
    receiving, from the at least one remote device, first data responsive to the command;
    receiving, from the at least one remote device, presentation framework data including:
        a first instruction indicating how and when a first portion of the first data is to be output, and
        a second instruction indicating how and when a second portion of the first data to be output;
    determining the first device is configured to output the first portion of the first data;
    determining a second device associated with the user profile;
    determining the second device is configured to output the second portion of the first data;
    sending, to the first device, the first instruction and the first portion of the first data; and
    sending, to the second device, the second instruction and the second portion of the first data.

2. The computer-implemented method of claim 1, wherein the presentation framework data further includes a third instruction indicating how and when second data is to be output, and wherein the computer-implemented method further comprises:
    sending, to the first device, the third instruction;
    after sending the third instruction to the first device, receiving the second data from the at least one remote device; and
    sending, to the first device, the second data.

3. The computer-implemented method of claim 1, wherein the presentation framework data further includes a third instruction indicating how and when second data is to be output, and wherein the computer-implemented method further comprises:
    determining at least one second remote device associated with the command;
    receiving, from the at least one second remote device, second data;
    sending, to the first device, the third instruction and the second data.

4. The computer-implemented method of claim 1, further comprising:
    receiving, from the first device, second data corresponding to a second command;
    sending, to the at least one remote device, a second signal:
        requesting data responsive to the second command,
        indicating a first unique identifier (ID) and first output capabilities of the first device, and
        indicating a second unique ID and second output capabilities of the second device;
    receiving, from the at least one remote device, second data responsive to the second command; and
    receiving, from the at least one remote device, second presentation framework data including:

a third instruction indicating the first unique ID as well as how and when a first portion of the second data is to be output, and a fourth instruction indicating the second unique ID as well as how and when a second portion of the second data is to be output.

5. A system comprising:

at least one processor; and at least one memory including instructions that, when executed by the at least one processor, cause the system to:

receive, from a first device, input data corresponding to a command;

send, to at least one remote device associated with the command, a signal requesting data responsive to the command;

receive, from the at least one remote device, first data responsive to the command;

receive, from the at least one remote device, presentation framework data including:

a first instruction indicating how a first portion of the first data is to be output, first trigger data indicating when the first portion of the first data is to be output, a second instruction indicating how a second portion of the first data is to be output, and second trigger data indicating when the second portion of the first data is to be output;

determine the first device is configured to output data corresponding to the first portion of the first data and the second portion of the first data; and send, to the first device, the presentation framework data and the first data.

6. The system of claim 5, wherein the at least one memory further includes instructions that, when executed by the at least one processor, further cause the system to:

receive, from the first device, second input data corresponding to a second command;

send, to the at least one remote device, a second signal requesting data responsive to the second command;

receive, from the at least one remote device, second data responsive to the second command;

receive, from the at least one remote device, second presentation framework data including:

a third instruction indicating how a first portion of the second data is to be output, third trigger data indicating when the first portion of the second data is to be output, a fourth instruction indicating how a second portion of the second data is to be output, and fourth trigger data indicating when the second portion of the second data is to be output;

determine a second device configured to output data corresponding to the second portion of the second data;

send, to the first device, the third instruction, the third trigger data, and the first portion of the second data; and send, to the second device, the fourth instruction, the fourth trigger data, and the second portion of the second data.

7. The system of claim 5, wherein:

the first instruction indicates a first output capability required for a device to output the first portion of the first data;

the second instruction indicates a second output capability required for a device to output the second portion of the first data; and the first device includes the first output capability and the second output capability.

8. The system of claim 5, wherein the presentation framework data further includes a third instruction indicating how second data is to be output, and wherein the at least one memory further includes instructions that, when executed by the at least one processor, further cause the system to:

send, to the first device, the third instruction;

after sending the third instruction to the first device, receive the second data from the at least one remote device; and send, to the first device, the second data.

9. The system of claim 5, wherein the presentation framework data further includes a third instruction indicating how second data is to be output, and wherein the at least one memory further includes instructions that, when executed by the at least one processor, further cause the system to:

determine at least one second remote device associated with the command;

receive, from the at least one second remote device, the second data; and send, to the first device, the third instruction and the second data.

10. The system of claim 5, wherein the at least one memory further includes instructions that, when executed by the at least one processor, further cause the system to:

receive, from the first device, second input data corresponding to a second command;

send, to the at least one remote device, a second signal:

requesting data responsive to the second command, indicating a first unique identifier (ID) of the first device, and indicating output capabilities of the first device;

receive, from the at least one remote device, second data responsive to the second command;

receive, from the at least one remote device, second presentation framework data including:

a third instruction indicating the first unique ID as well as how a first portion of the second data is to be output, third trigger data indicating when the first portion of the second data is to be output, a fourth instruction indicating the first unique ID as well as how a second portion of the second data is to be output, and fourth trigger data indicating when the second portion of the second data is to be output.

11. The system of claim 5, wherein:

the first instruction is associated with a first start indication; and the second instruction is associated with a second start indication.

12. The system of claim 5, wherein the input data corresponds to one of:

input audio data generated from input audio received from at least one microphone of the first device; or input text data generated from input text received from a touch sensitive interface of the first device.

13. A computer-implemented method comprising:

receiving, from a first device, input data corresponding to a command;

sending, to at least one remote device associated with the command, a signal requesting data responsive to the command;

receiving, from the at least one remote device, first data responsive to the command;

receiving, from the at least one remote device, presentation framework data including:
  a first instruction indicating how a first portion of the first data is to be output,
  first trigger data indicating when the first portion of first data is to be output,
  a second instruction indicating how a second portion of the first data is to be output, and
  second trigger data indicating when the second portion of the first data is to be output;
determining the first device is configured to output data corresponding to the first portion of the first data and the second portion of the first data; and
  sending, to the first device, the presentation framework data and the first data.

14. The computer-implemented method of claim 13, further comprising:
  receiving, from the first device, second input data corresponding to a second command;
  sending, to the at least one remote device, a second signal requesting data responsive to the second command;
  receiving, from the at least one remote device, second data responsive to the second command;
  receiving, from the at least one remote device, second presentation framework data including:
    a third instruction indicating how a first portion of the second data is to be output,
    third trigger data indicating when the first portion of the second data is to be output,
    a fourth instruction indicating how a second portion of the second data is to be output, and
    fourth trigger data indicating when the second portion of the second data is to be output;
  determining a second device configured to output data corresponding to the second portion of the second data;
  sending, to the first device, the third instruction, the third trigger data, and the first portion of the second data; and
  sending, to the second device, the fourth instruction, the fourth trigger data, and the second portion of the second data.

15. The computer-implemented method of claim 13, wherein:
  the first instruction indicates a first output capability required for a device to output the first portion of the first data;
  the second instruction indicates a second output capability required for a device to output the second portion of the first data; and
  the first device includes the first output capability and the second output capability.

16. The computer-implemented method of claim 13, wherein the presentation framework data further includes a third instruction indicating how second data is to be output, and wherein the computer-implemented method further comprises:
  sending, to the first device, the third instruction;
  after sending the third instruction to the first device, receiving the second data from the at least one remote device; and
  sending, to the first device, the second data.

17. The computer-implemented method of claim 13, wherein the presentation framework data further includes a third instruction indicating how second data is to be output, and wherein the computer-implemented method further comprises:
  determining at least one second remote device associated with the command;
  receiving, from the at least one second remote device, the second data; and
  sending, to the first device, the third instruction and the second data.

18. The computer-implemented method of claim 13, further comprising:
  receiving, from the first device, second input data corresponding to a second command;
  sending, to the at least one remote device, a second signal:
    requesting data responsive to the second command,
    indicating a first unique identifier (ID) of the first device, and
    indicating output capabilities of the first device;
  receiving, from the at least one remote device, second data responsive to the second command;
  receiving, from the at least one remote device, second presentation framework data including:
    a third instruction indicating the first unique ID as well as how a first portion of the second data is to be output,
    third trigger data indicating when the first portion of the second data is to be output,
    a fourth instruction indicating the first unique ID as well as how a second portion of the second data is to be output, and
    fourth trigger data indicating at least one fourth condition when the second portion of the second data is to be output.

19. The computer-implemented method of claim 13, wherein:
  the first instruction is associated with a first start indication; and
  the second instruction is associated with a second start indication.

20. The computer-implemented method of claim 13, wherein the input data corresponds to one of:
  input audio data generated from input audio received from at least one microphone of the first device; or
  input text data generated from input text received from a touch sensitive interface of the first device.

21. The system of claim 5, wherein:
  the first portion of the first data corresponds to a first data type; and
  the second portion of the first data corresponds to a second data type.

22. The system of claim 21, wherein the first instruction indicates the first portion of the first data is to be output as a third data type.

23. The system of claim 22, wherein:
  the first data type is text data; and
  the third data type corresponds to computer-synthesized speech.

* * * * *